(No Model.)
A. B. UPHAM.
COMBINED MEASURE AND SCALE.
No. 290,945. Patented Dec. 25, 1883.
Fig. 1
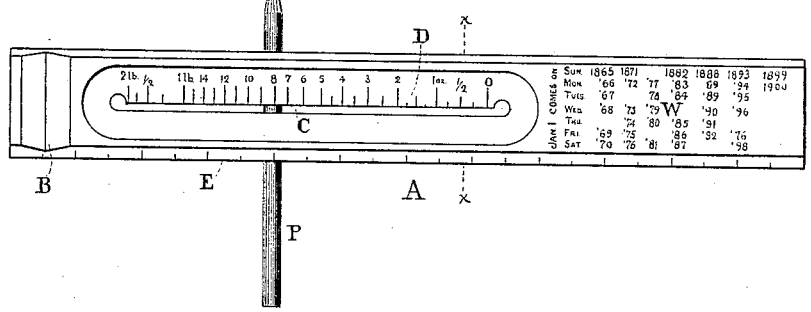
Fig. 2
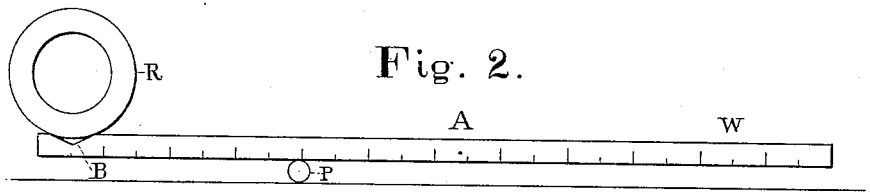
Fig. 3
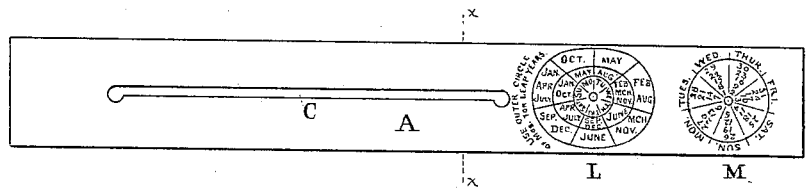
Witnesses,
H. W. Wells
Rich'd A. Goldsbrough
Fig. 4
Inventor,
Artemas B. Upham
N. PETERS, Photo-Lithographer, Washington, D. C.

United States Patent Office.

ARTEMAS B. UPHAM, OF PEORIA, ILLINOIS, ASSIGNOR OF ONE-HALF TO HENRY W. WELLS, OF SAME PLACE.

COMBINED MEASURE AND SCALE.

SPECIFICATION forming part of Letters Patent No. 290,945, dated December 25, 1883.

Application filed December 1, 1882. (No model.)

*To all whom it may concern:*

Be it known that I, ARTEMAS B. UPHAM, of Peoria, in the county of Peoria and State of Illinois, have invented a Combined Measure and Scale; and I do hereby declare that the following is a full, clear, and exact description thereof, reference being had to the annexed drawings, making a part of this specification, in which like letters of reference refer to like parts, and in which—

Figure 1 represents view of top; Fig. 2, side view; Fig. 3, view of under side; Fig. 4, transverse section at $x\ x$.

The object of this invention is the construction of a single instrument adapted to be used as a measure of distance, and also as an accurate and ready means for ascertaining the weight of a letter, a square or cylindrical package, or even a pail and its contents.

In the drawings I have shown a foot-rule adapted for the uses just named, upon one edge, E, of which are the inch or other marks of distance. Its other edge may be made true and sharp for use as a straight-edge and paper-cutter. Longitudinally through a portion of the rule is cut a slot, C, the side D of which should be in the line of the transverse center of gravity of the rule. Upon this side D of said slot are inscribed the units of weight at such points as would be centers of equilibrium when the different weights are placed separately in the notch B. The object of having said edge D in the line described is that there may be no need of carefulness in having the pencil P or other fulcrum-edge used at exactly right angles to the rule A. By having the notch B V-shaped, any cylindrical package, whatever its diameter, will be held by the equally sloping sides of said notch, with its center directly over the line of intersection of said sloping sides.

In the construction just described I have shown the form necessary when the rule is the ordinary broad twelve or eighteen inch one most in favor with book-keepers and others. In the case of a yard-stick or similar long rod, it is sufficiently accurate to have the weight-marks imprinted upon a side or edge. My favorite shape for a yard-stick is to have it triangular in cross-section and have the weight-marks upon one of the edges, with the inch-marks upon another edge, and the proportional parts of a yard upon the third edge.

To make my combined measure and scale sufficiently accurate and adapted for weighing heavy articles, it is necessary to insert into the body of the rule, yard-stick, or other form of measure used, at the end opposite from the notch B, a mass of lead or other weighty metal.

In using this instrument for a letter-scale, it is placed upon a pencil or pen-holder, and, having laid the letter upon said instrument centrally over the notch B, the whole is slid along upon its fulcrum until balanced thereon.
The weight-mark nearest the fulcrum-edge shows the weight of the letter. A cylindrical package is weighed in the same way, except in being laid in the notch B, as shown in Fig. 2. In Fig. 1 the mark nearest the pencil P shows the roll to be a little over eight ounces in weight.

In ascertaining the weight of a pail and its contents, the handle of the pail is hooked in the notch B and allowed to hang beside a table, the sharp edge of which serves as the fulcrum for the scales.

What I claim as my invention, and for which I desire Letters Patent, is as follows, to wit:

1. A measuring-rod having at one end a V-shaped notch, and upon a side or edge a scale of weights, substantially as and for the purpose specified.

2. A measuring-rod having at one end a V-shaped notch, at the opposite end a metal weight, and upon a side or edge a scale of weights, for the purpose set forth.

3. A measuring-rod having at one end a V-shaped notch, and upon a side or edge a scale of weights, whereby, upon placing a package or other article in said notch and balancing the whole upon any convenient fulcrum, the weight of said package is shown, substantially as and for the purpose specified.

4. A rod having at one end a V-shaped notch, at opposite end a metal weight, and upon a side or edge a scale of weights, substantially as and for the purpose herein set forth.

5. A rule having measuring-edge E, notch B, and slot C, having scale of weights D, substantially as and for the purpose set forth.

6. A rule having measuring-edge E, V-shaped notch B, weighted end W, and wedge-shaped slot C, having scale of weights D, substantially as and for the purpose specified.

In testimony that I claim the foregoing invention I have hereunto set my hand this 28th day of November, 1882.

ARTEMAS B. UPHAM.

Witnesses:
    HENRY W. WELLS,
    RICHD. A. GOLDSBROUGH.